United States Patent [19]

Nelson

[11] 4,148,371
[45] Apr. 10, 1979

[54] LOAD CELL SCALE

[76] Inventor: David P. Nelson, 3256 Judith La., Lafayette, Calif. 94549

[21] Appl. No.: 874,913

[22] Filed: Feb. 2, 1978

[51] Int. Cl.² .......................................... G01G 21/08
[52] U.S. Cl. .............................. 177/256; 177/DIG. 9
[58] Field of Search ................... 177/208, 256, , 257, 177/DIG. 9

[56] References Cited

U.S. PATENT DOCUMENTS

| 3,164,218 | 1/1965 | McClimon | 177/208 X |
| 3,464,509 | 9/1969 | Gray | 177/208 |
| 3,465,838 | 9/1969 | Kienzle et al. | 177/208 X |
| 3,658,143 | 4/1972 | Schwartz | 177/208 |
| 3,931,860 | 1/1976 | Czyryk | 177/257 |

FOREIGN PATENT DOCUMENTS

| 1492099 | 7/1967 | France | 177/208 |
| 2240441 | 4/1975 | France | 177/DIG. 9 |

Primary Examiner—George H. Miller, Jr.

[57] ABSTRACT

An improved load cell scale which comprises a load supporting frame pivotally carried upon levers which bear upon a load cell on the frame and, are in turn, pivoted upon fulcrum pins. All pivot pins are journaled in oversized bores formed in the levers so as to rock the pins with a slight rolling motion in the bores under load-induced pivotal action, rather than with rotation about the pin axis.

4 Claims, 6 Drawing Figures

U.S. Patent    Apr. 10, 1979    4,148,371
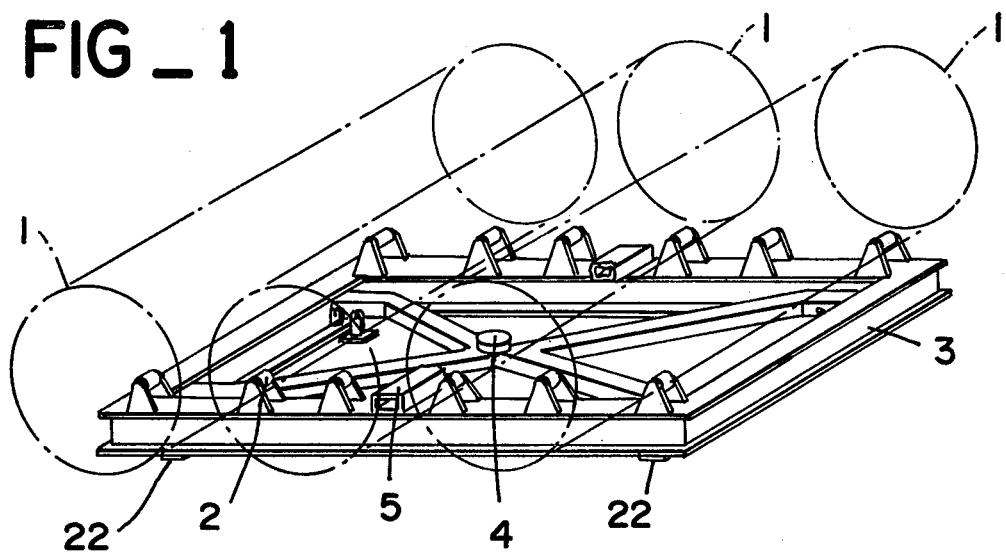
FIG_1
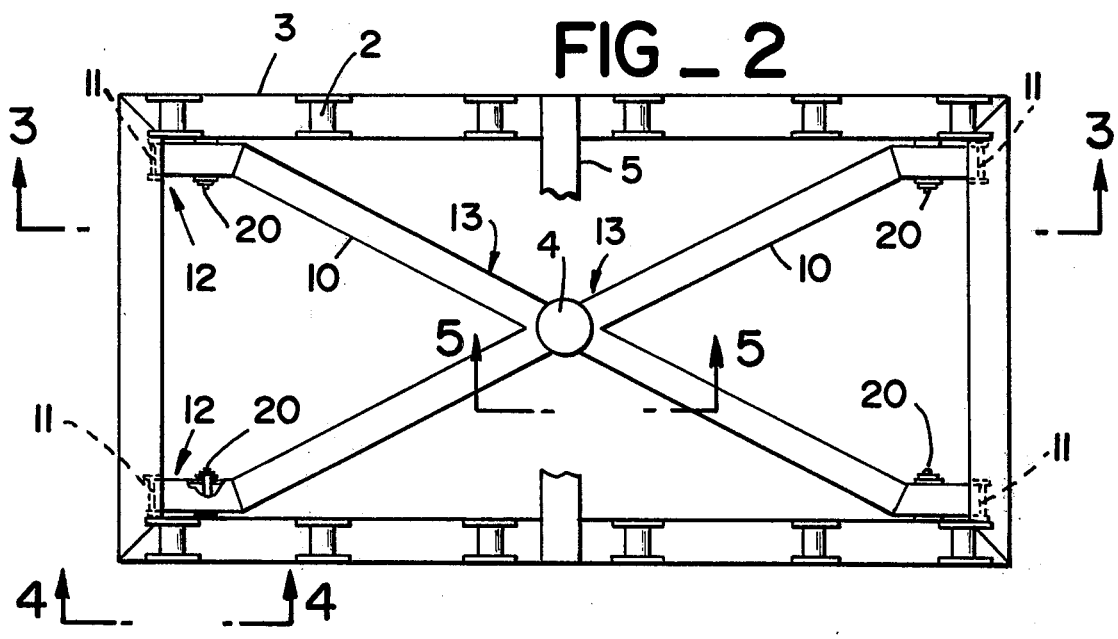
FIG_2
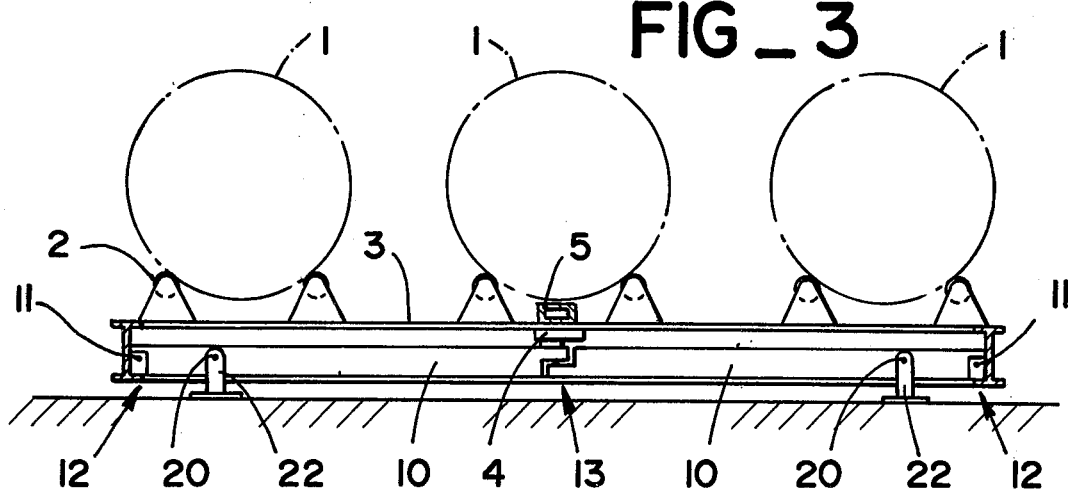
FIG_3

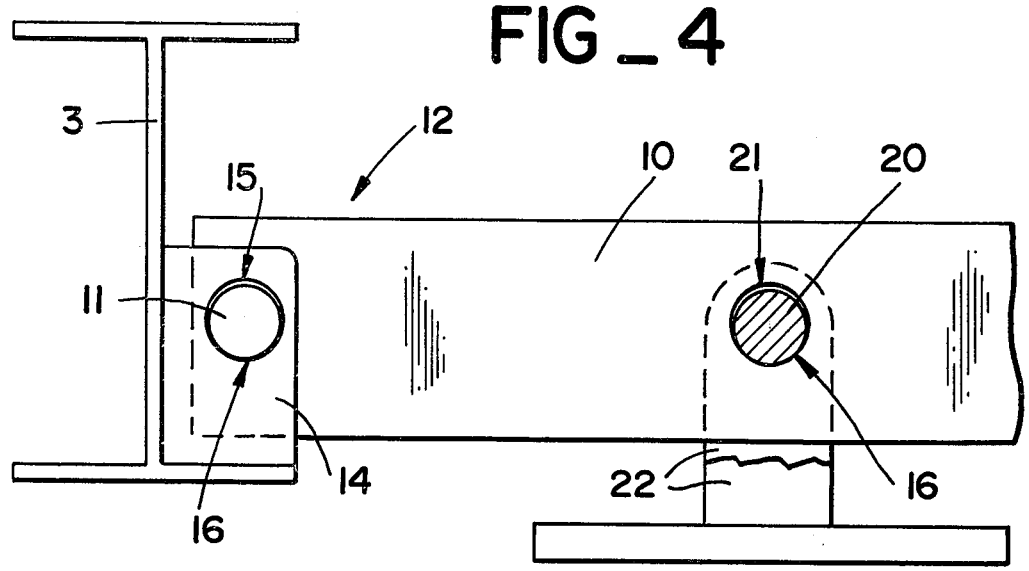
FIG_4
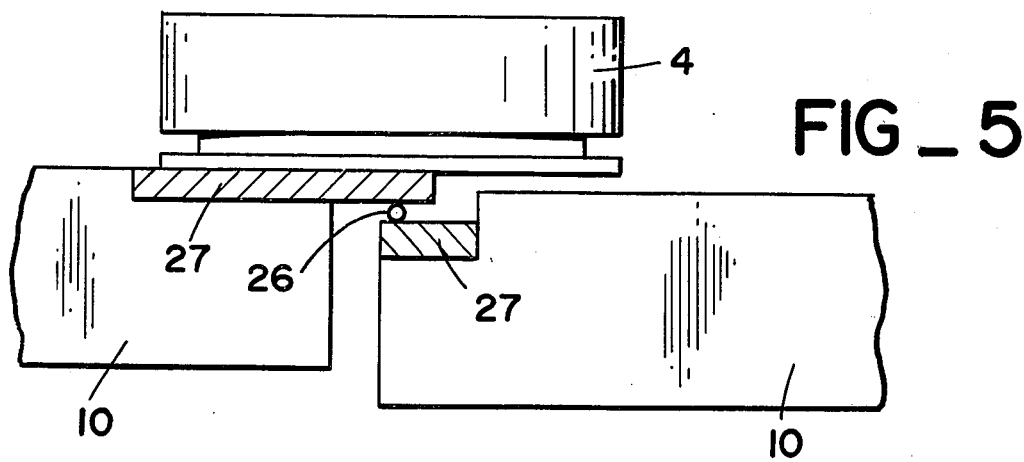
FIG_5
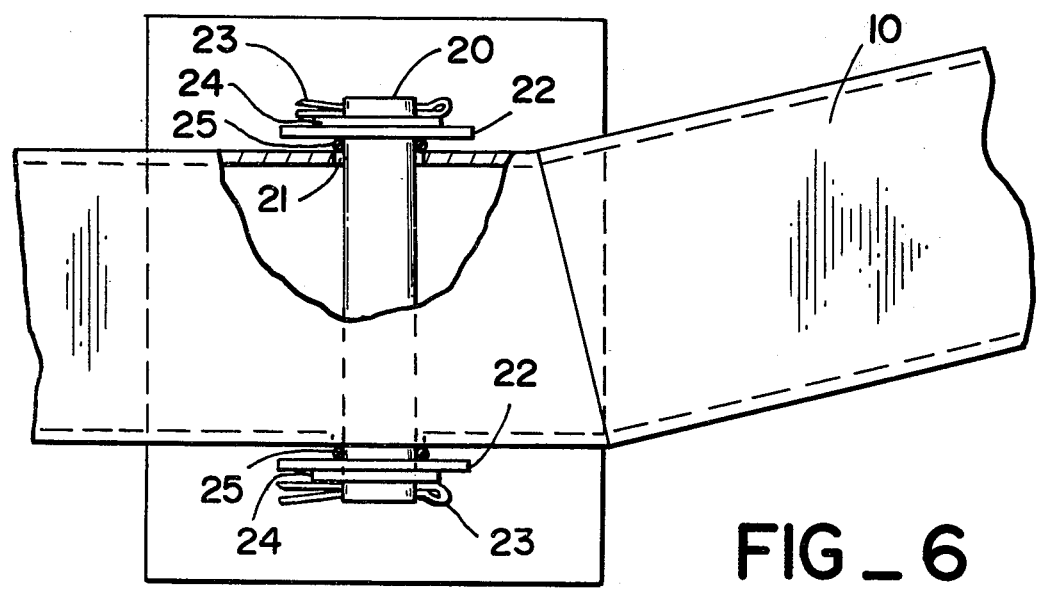
FIG_6

LOAD CELL SCALE

BACKGROUND OF THE INVENTION

Load cell scales have been designed which include a frame pivotally mounted along one side upon fixed floor mounted trunnions and bearing at the other side upon a load cell carried upon the same supporting floor. For increased load capacity, a pair of such pivoted frames has been used to bear upon a single load cell placed between them.

The accuracy of such prior art scale designs is impaired where the center of gravity of a composite load varies but, nonetheless, needs to be applied to a long lever arm to achieve increased weighing capability. The described pivoted frame scales, for example, can handle only one or two ton-chlorine cylinders.

Prior art knife-edge and flexure type scales, while having the requisite accuracy, are complicated structurally, need expertise in installation and usually do not withstand service with high shock loading.

The present invention, on the other hand, employs a single frame with virtually unlimited load capacity that has internal levers which bear upon a load cell carried at the middle of the frame. The levers pivotally connect the extremities of the frame and pivot upon fulcrum pins mounted in brackets set upon a supporting surface such as the floor. The levers journal upon the pivot pins in bores slightly larger than the diameter of the pins so that the pins rock with slight rolling action within the bores under load-induced pivotal action. The scale of this invention can handle three or more ton-chlorine cylinders, for example, with accuracies within the range of 0.5 percent of full scale.

A principal object of this invention is to provide a scale using rocking pin mounted lever.

One object of this invention also is to provide a scale with journaled pins to confirm the pivot and fulcrum points.

An object of this invention is to overcome the error in weighing loads of varying center of gravity upon fixed fulcrum scales.

Another object of the invention is to provide a fixed fulcrum scale that is inexpensive and simple to fabricate and to install.

Other objects and advantages of this invention will become apparent to those skilled in the art upon consideration of the following description of a preferred embodiment and the accompanying drawings.

IN THE DRAWINGS

FIG. 1 is a perspective view of the scale of this invention shown carrying three ton-chlorine cylinders in phantom lines;

FIG. 2 is a top plan view of the scale of this invention;

FIG. 3 is a vertical sectional view of the scale of this invention taken along line 3—3 of FIG. 2;

FIG. 4 is a partial and enlarged elevational view of the fulcrum pin and pivot pin and frame arrangement for one lever taken at line 4—4 of FIG. 2;

FIG. 5 is a partial and enlarged elevational view showing the lever ends bearing upon the load cell taken at lines 5—5 of FIG. 2; and FIG. 6 is a top enlarged view of one fulcrum pin and the lever journaled upon it.

DESCRIPTION OF THE PREFERRED EMBODIMENT

FIG. 1 illustrates the improved load cell scale of this invention supporting, in phantom lines, three large, toncylinders of the type usually used to contain chlorine used in municipal water and sewage treatment plants. The center of gravity of the composite load may vary as chlorine is used nonuniformly from the cylinders. The cylinders, illustrated in phantom lines as 1, are supported on trunnions 2 unpon a movable open frame 3. The frame in the illustrated embodiment is fabricated from steel I-beam material to fixed dimension.

The movable frame carries at its center a hydraulic load cell 4 secured to a tubular steel beam 5 welded across the top of the frame 3. As will be apparent to those familiar with hydraulic load cell scales, the load cell 4 is connected to an indicating meter in a closed hydraulic system which is not shown and is not claimed as part of the invention.

Within the movable frame 3, a pair of levers 10 each pivots upon coaxial pivot pins 11 mounted at the corners of the movable frame at a first end 12 and bears upon the load cell 4 at the opposite second end at 13. The pivot pins 11 are mounted at the corners of the movable frame 3 upon ears 14 welded to the frame as is more clearly illustrated in FIG. 4. The ears 14 and levers 10 have bores 15 drilled to a diameter slightly larger than the diameter of pivot pins 11. This enables the pivot pins 11 to rock with a slight rolling action about the line of tangency, as at 16, of each pin surface with the bore surfaces under load-induced pivotal action.

Each lever 10 is carried upon coaxial fulcrum pins 20. In the described embodiment, each of the fulcrum pins 20 is journaled in a pair of coaxial bores 21 in the rectangular tubular levers 10 and brackets 22 to define coaxial fulcrums for each lever intermediate pivot pins 11 and the second end 13 of each lever which bears upon load cell 4. The bores 21 are of slightly larger diameter than the diameter of pins 20 so that the pins 20 also rock with a slight rolling action about the line of tangency, as at 16, of each pin surface with the surfaces of bores 21 under load-induced pivotal action. This eliminates binding which might otherwise occur since the bores 15 and 21 in levers 10 are fixed in distance apart. This distance between their centers is the only close tolerance dimension in this scale design. By way of example, for pivot pins 11 and fulcrum pins 20 having a diameter of 7/8 of an inch, the bores 15 and 21 are 15/16 of an inch in diameter.

Each fulcrum pin 20 is supported in a bracket 22 merely set or fixedly mounted upon a supporting surface such as the floor. Each pivot pin 11 and each fulcrum pin 20 is secured at each end to ears 14 or brackets 22 and frame 3, respectively, by means of cotter pins 23, steel washer 24 and nylon washer 25 as is shown in FIG. 6 for fulcrum pins 20.

A round bar 26 bearing upon hardened inserts 27 at the second end 13 of the levers 10 applies the load on each lever by line contact to the center of the load cell 4.

While the invention has been described in terms of the foregoing preferred embodiment, various modifications will be apparent to those familiar with the load scale art within the scope of the invention which is defined in the following claims.

I claim:

1. An improved load cell scale comprising
   a movable frame carrying a load;
   a load cell mounted on the frame;
   a pair of levers each pivotally mounted to the frame near a first end of the lever and bearing upon the load cell at a second opposite end of the lever;
   at least a pair of pivotable fulcrum pins mounted on a supporting base and each carrying one of the levers at a fulcrum, each lever at the fulcrum being journaled upon its mating fulcrum pin in a bore slightly greater in diameter than the diameter of the fulcrum pin so the pin can roll in said bore as the lever pivots under load.

2. The improved load cell scale of claim 1 further including
   at least one pivot pin pivotally mounting each lever to said frame in a bore journaled upon the pin and having a diameter slightly greater than the diameter of the pin so the pin can roll in the bore as the lever pivots under load.

3. The improved load cell scale of claim 1 wherein the movable frame is an open rectangular frame; and the load cell is fixedly mounted at the center of the frame.

4. The improved load cell of claim 1 wherein the fulcrum of each lever is intermediate the first and second ends of the lever.

* * * * *